United States Patent [19]

Bush et al.

[11] E Re. 31,398

[45] Reissued Sep. 27, 1983

[54] ELECTRONIC AUDIO SIGNALLING DEVICE FOR TELEPHONES

[75] Inventors: Terry D. Bush; Dennis J. Denen, both of Columbus, Ohio

[73] Assignee: Floyd Bell Associates, Inc., Columbus, Ohio

[21] Appl. No.: 276,204

[22] Filed: Jun. 22, 1981

Related U.S. Patent Documents

Reissue of:

[64] Patent No.: 4,214,131
Issued: Jul. 22, 1980
Appl. No.: 970,633
Filed: Dec. 18, 1978

U.S. Applications:

[63] Continuation-in-part of Ser. No. 843,456, Oct. 19, 1977, Pat. No. 4,157,459.

[51] Int. Cl.[3] ..... H04M 1/00
[52] U.S. Cl. ..... 179/84 T
[58] Field of Search ..... 179/84 R, 84 T, 84 L, 179/110 A; 181/148, 153, 156, 185; 340/384 E

[56] References Cited

U.S. PATENT DOCUMENTS

| | | | |
|---|---|---|---|
| 1,884,724 | 10/1932 | Keller | 181/148 |
| 2,808,463 | 10/1957 | Jenkins | 179/84 T |
| 3,826,333 | 7/1974 | Buckwalter | 181/156 |
| 3,860,838 | 1/1975 | Kumon | 179/110 A |
| 3,867,585 | 2/1975 | Morstadt | 179/84 T |
| 3,965,307 | 6/1976 | Dimmer | 179/84 T |
| 4,157,459 | 6/1979 | Bush et al. | 179/84 T |

FOREIGN PATENT DOCUMENTS

| | | | |
|---|---|---|---|
| 2203857 | 1/1972 | Fed. Rep. of Germany | 179/84 T |

*Primary Examiner*—Joseph A. Popek
*Attorney, Agent, or Firm*—Mueller and Smith

[57] ABSTRACT

A signalling device to be substituted for the usual electromechanical ringer of a telephone, either as a replacement for that ringer in existing telephone instruments or as a part of the original manufactured instrument. It includes solid-state circuitry for eliminating noise pulses and an electronic oscillator circuit which will operate effectively on a minimum current supply along with a mechanical arrangement of components to obtain a compact unit with a folded horn or Helmholtz resonator type acoustical loading system and adjustable volume control.

21 Claims, 5 Drawing Figures

ELECTRONIC AUDIO SIGNALLING DEVICE FOR TELEPHONES

Matter enclosed in heavy brackets [ ] appears in the original patent but forms no part of this reissue specification; matter printed in italics indicates the additions made by reissue.

BACKGROUND OF THE INVENTION

This application is a continuation-in-part of our copending application Ser. No. 843,456 filed Oct. 19, 1977 now U.S. Pat. No. 4,157,459.

At the present time, the tendency in telephone installations is to have many extensions on the same line. The electromechanical ringers or bells now commonly in telephone instruments consume relatively large amounts of power so that three to five instruments, at the most, can be connected to a standard telephone line and still have the ringers function. Even if greater amounts of power could be supplied for actuating the ringers, the standard telephone lines are not adequate to carry that power.

Present ringers or bells are also limited by their construction and principle of operation. As the ringer is electromechanical, a coil of wire is employed and for compatibility with the ringer signal, this coil is composed of many turns of fine wire. The coil, in turn, is mounted within a magnetic circuit comprised of several different magnetic or permeable elements. These magnetic circuits are fabricated with expensive materials for which there is no domestic source. The element cobalt used in the Alnico magnet is an example. Due to conditions in the producer nations, the price of cobalt has increased by a factor of 817% in 1978. Moreover, a magnetic circuit must be tuned to a particular ringing frequency by careful selection of the vibrating masses and spring forces. Thus, it must be a precision-manufactured instrument of subtle complexity and considerable expense. These principles of design and operation preclude the possibility of [miniturization] *miniaturization* . Thus, a ringer of this size and expense has had a definite influence on the physical design or more streamlined and compact or more stylish telephones in the future as well as add to the retail price of such telephones. Also, to some people the usual bell has a harsh and irritating sound.

Others have developed or attempted to develop electronic ringer substitutes. The resulting hardware has had limited application in office phones and PBX systems. Low volume outputs, lack of volume control, size reliability and noise pick-up were all limiting factors. An overriding problem in the design of a circuit to replace a telephone ringer is that a simple electronic tone emitter is undesirable due to spurious sound being generated when any electrical noise, i.e., voltage pulses other than ringing voltage, is present on the line to the ringer. Those noise pulses can be generated from dialing, picking up the receiver, etc. and are commonly referred to as "bell-tapping" noises.

SUMMARY OF THE INVENTION

The present invention provides for a telephone signalling device which is much more compact and smaller, lighter, simpler, and more efficient than the electromechanical bell now commonly in use. Furthermore, as compared to prior electronic devices, it has increased sound output, a more pleasant musical tone, and better "bell-tapping" suppression. Although the device of this invention is especially useful as a replacement for the usual bell of a telephone, and will be describedmainly as such herein, it is to be understood that it can be incorporated in a telephone as originally manufactured with resultant reduction in size, etc.

The device of this invention includes a solid state electronic square wave oscillator circuit which includes a piezoelectric element which is actuated by the usual telephone current supply to provide the audio signal. The piezoelectric element is mounted on a diaphragm within a tubular housing in cooperation with an acoustical baffle in such a manner as to provide a folded horn or Helmholtz resonator acoustical loading system. It is important that the oscillator circuit be normally disabled and only allowed to operate during the time when proper signalling voltage is supplied. Thus the circuit includes elements solely for eliminating certain voltage pulses, other than ringing or signalling voltage, resulting from normal usage of the telephone such as dialing, picking up the receiver, etc. The circuit also includes additional independent elements to serve as a voltage-limiting network, elements to insure low power consumption, elements for frequency tuning and modulation and a downstream buffer driving stage. Beyond or outwardly of the acoustical baffle, the tubular housing is provided with a volume control in the form of a sound-dampening unit consisting of relatively rotatable damper members which provide a convenient mechanical sound-level control.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
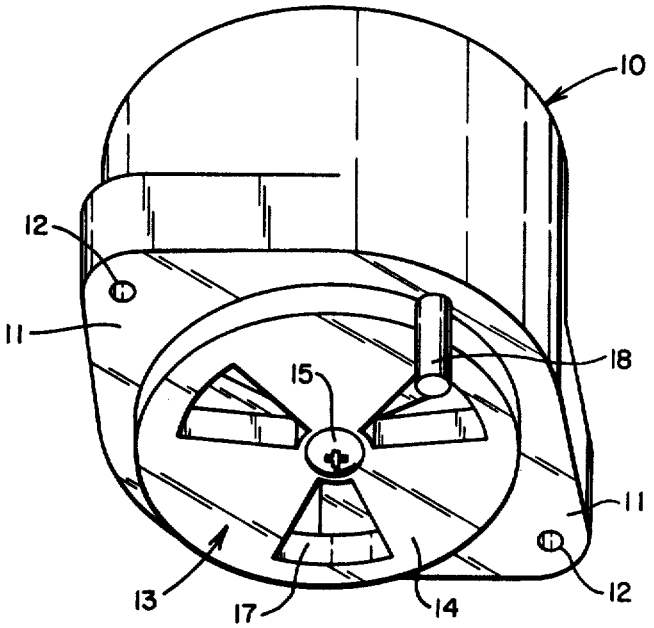
FIG. 1 is a perspective view of the device.
Figure 2:
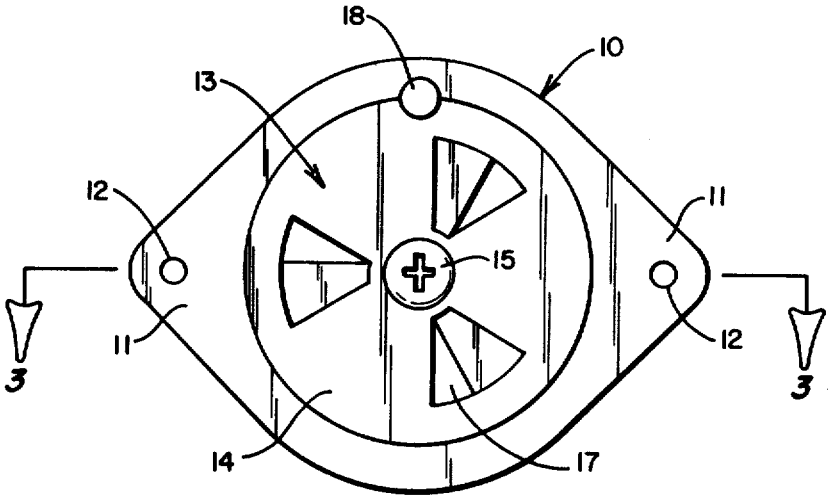
FIG. 2 is a view of the bottom end of the device illustrated in FIG. 1, partly cut away.

The physical structure of the device is [show] *shown* in [FIG.] *FIGS.* 1 to 4, inclusive, and it includes a housing 10 which is preferably in tubular form and is of a suitable rigid plastic. This tubular housing has opposite diametrically-projecting mounting ears 11, with screw-passing openings 12, at its one end which is the lower or bottom end with the housing in the position indicated in FIG. 1. The lower end of the tubular housing carries the volume control unit 13. This unit consists of an outer disc 14 which is rotatably mounted by a central pivot 15 on the disc-like outer or bottom wall 16 of the housing 10. Each disc 14 and 16 is provided with an identical pattern of sound passages in the form of segmental slots or openings but other sound passage openings could be used. The openings 17 in the discs can be brought into complete coincidence or out of coincidence as much as desired by rotating the disc 14 to cover part of the openings in each disc by solid portions of the other disc. Thus, a mechanical volume control is provided in the form of a sound dampener which consists of superimposed perforated baffles relatively rotatable to completely close the sound passages provided thereby or to select the area of the passages to be opened. To rotate the disc 14, it is provided with a depending lug 18 at its periphery that can be readily engaged by the fingers exteriorly of the housing.

Figure 3:
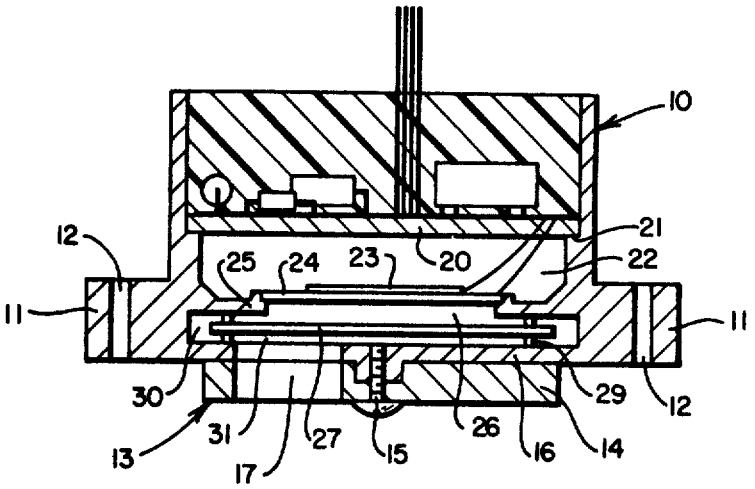
FIG. 3 is an axial sectional view taken along line 3—3 of FIG. 2.

The elements of the circuit of the device are disposed within the housing 10 and consist of a printed circuit board assembly 20 (FIG. 3) which carries most of the electrical components, the board, in the example shown, being of disc-shaped and resting on a circular shoulder 21 intermediate the height of the tubular housing. Above, the assembly 20, the housing 10 may be filled with suitable potting material to hold the assembly in place and protect the elements thereof with a water tight seal.

Figure 4:
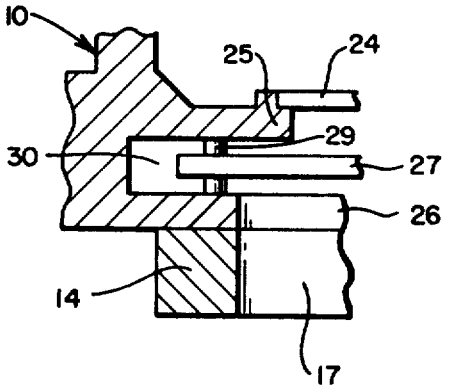
FIG. 4 is an enlarged axial sectional view of the lower end of the device.

Below the assembly 20, in the housing 10, is formed the chamber 22 and within this chamber is mounted the signalling device of the circuit which includes an amorphous piezoelectric ceramic element 23 shown as a disc, but which can be of other shapes. This element is permanently bonded to one side, the upper side of this example, of a thin flexible diaphragm 24 as shown as circular, preferably of brass, which rests on and is centered on an annular flange or ledge 25 (FIGS. 3 and 4) within the housing. Beyond or below the diaphragm 24 is mounted, in a fixed axial position, a relatively thick metal disc 27, preferably of aluminum to serve as [a] *an* acoustical baffle in the folded horn implementation of the invention but which can be omitted if a Helmholtz resonator is to be used. Cavity 26 is between discs 24 and 27. This rigid disc 27 is supported between the inwardly-projecting flange 25 and the disc or wall 16. The flange 25 and wall 16 carry angularly-spaced pairs of opposed vertical pins 29, between which the disc 27 is held, and which permit passage radially of sound waves into and out of a surrounding annular chamber 30.This provides, in the example shown, a folded horn arrangement.

In operation, the piezoelectric element 23 will be energized by the telephone current and will drive the flexible diaphragm 24 to produce acoustical current or pressure waves which travel through the horn cavity 26 into contact with the baffle 27 which will deflect them radially outwardly through the horn cavity 26 into the annular space 30, downwardly and then radially inwardly to concentrate them in the outer-most chamber 31 between the baffle 27 and disc [15] *14*. The volume of the sound emitted from the chamber 31 can be controlled by the setting of the disc 14.

Thus, in this device there will be provided a folded horn type acoustical loading system, due to the fact that the sound waves are caused to travel a curvaceous path around the edge of the baffle 27 before they enter the chamber 31, and then leave the chamber 31 of the housing through the volume control damper including the rotatable disc 14. This acoustical loading system will result in higher efficiency that reflects the achievement of substantially higher sound outputs from the piezoelectric element of the device with substantially lower operating currents. The volume control 13 of relatively rotatable perforated discs cooperates with the sound-deflecting baffle 27 spaced inwardly thereof and arranged to produce the folded horn effect. Without, the baffle disc as in the Helmholtz type resonator the opening and closing of the openings 17 in the relatively rotatable discs would modify the frequency of resonance. However, with the baffle in the combination, the folded horn effect is obtained and a clean and clear adjustment of volume therewith is obtained by relative rotation of the discs.

Figure 5:
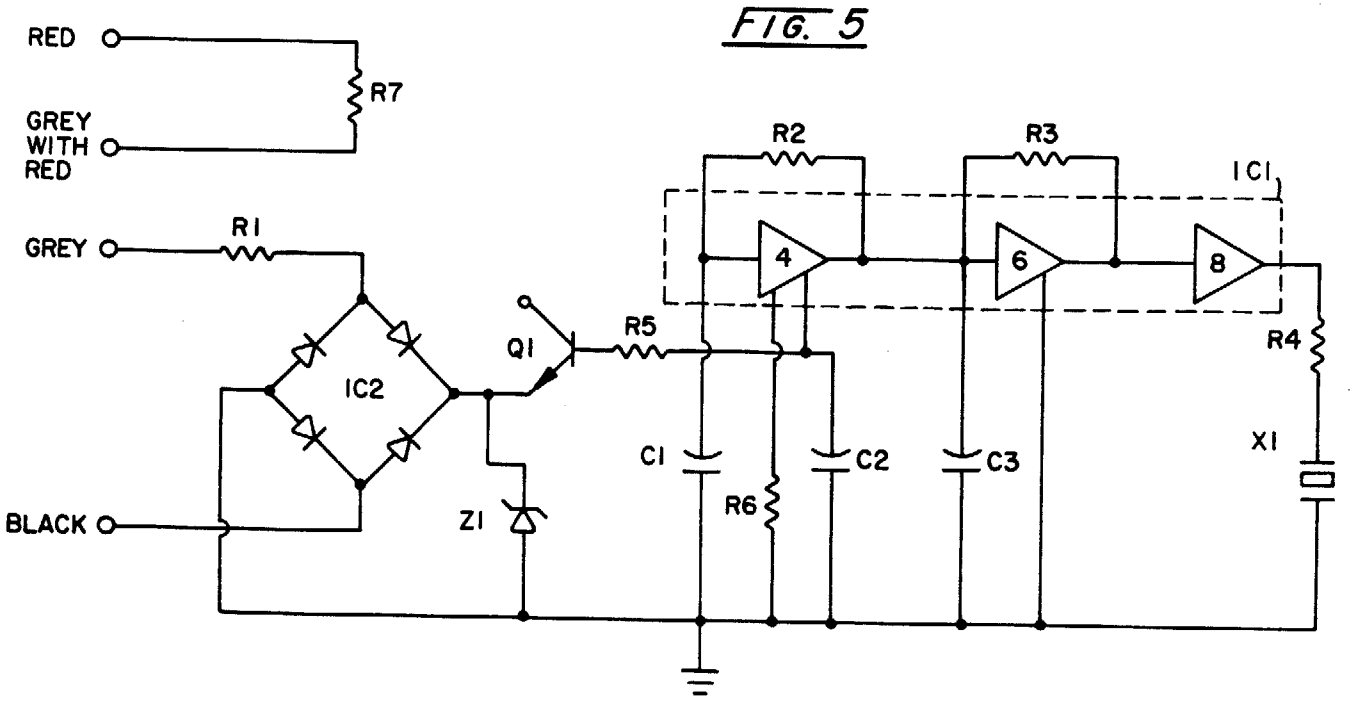
FIG. 5 is a schematic illustration of the circuit of the device.

The circuit of this unit or device is illustrated schematically in FIG. 5 and is shown as including four leads. The four leads are identified in the schematic with the color designations red, black, grey, and grey with red stripe. These four leads are provided to facilitate connecting the device to the usual telephone circuit.

The grey with red and the red leads may [beinternally] *be internally* shorted by a jumper connection (not shown) or, as a manufacturing option, may attach to a resistor of a value characteristic of a particular ringer of the telephone which is to be replaced. The red/grey with red leads are shown connected to a resistance R7 as a convenience feature which eliminates the need of a separate and external resistor or [jumber] *jumper* when this device is substituted for the standard electromechanical bell which requires all four connections. The other grey and black leads are the active terminals through which the signal current is applied to the circuit of this device. Functionally, within the telephone, they are similar and may be reversely-connected. The red/black/grey/grey with red color scheme is retained only as telephone conventional practice which allows direct, color-coded replacement connection but other lead arrangements and codes can be provided.

The circuit of FIG. 5 includes a square wave oscillator audio-signalling circuit connected to the votage supply leads from the telephone, the grey/black leads, and to the piezoelectric crystal element XI. This oscillator circuit consists of a square-wave driving network with oscillator frequency controlling components connected to a buffer driving network including the piezoelectric element. Connected between the leads and the oscillator circuit is a voltage-limiting network for receiving the [voltages] *voltage* impulses and effecting full wave bridge rectification, through a full wave bridge rectifier, and including a voltage-limiting resistance and a voltage-clamping element. A disabling network is connected between the leads and the oscillator circuit for disabling it except when proper signalling voltage is supplied so as to suppress voltage pulses giving a rise to undesired audio outputs in the telephone to which it is applied and including components in addition to said voltage-limiting network and independent of the said square wave driving and oscillator frequency control network for the sole purpose of preventing application of voltages unless they are in the selected range of proper signalling voltages.

More specifically, the circuit includes a full wave bridge rectifier 1C2 at the input, which is a VM-08 50V PIV, *and* effects full wave rectification of the incoming signal voltage, allowing both half cycles to provide voltage to the oscillator circuit. This rectifier has the important advantage of increasing the sound power output of the piezoelectric element XI by applying more power to its driving circuit. A 2.2K resistor, R1, is connected in series with the bridge rectifier and serves as a current limiting element which protects said rectifier but it may have a value up to 10K.

The oscillator circuit is a square wave oscillator circuit of the linear bipolar transistor integrated circuit type, [ususally] *usually* designated as a FBA-405-478 custom integrated circuit, and consisting of the stages 4, 6 and 8 connected in series with 2.2K resistor R4 and the piezoelectric element XI. [This element is preferably] *The integrated circuit including the above stages is shown in FIG. 5 within a dashed boundary labeled 1C1. Element XI preferably is* a PZT 5A crystal, $\frac{1}{2}\times\frac{1}{2}\times 0.010$ inches, approximately 0.01nfd capacitance, and 2K to 8KZ at resonance. It also includes oscillator frequency controlling elements in the form of a 5.6M resistor R2 and a 100K resistor R3 connected in parallel with the respective stages 4 and 6 and a 0.047mf [cpacitor] *capacitor*C1 and a 0.001mf capacitor C3 connected in series from the respective resistors to ground, this combination of components serving as a square-wave oscillator. The remaining stage 8 and 2.2K resistor R4 form a buffer driving stage oscillator for the piezoelectric crystal X1.

Elements or components R1, Z1, R5, R6 and C2 are involved in enabling the circuit to ignore voltage pulses present on the telephone voltage supply line due to dialing, hook switch actuation, and other sources of the phenomenon known in the telephone industry as "bell-tapping". R1 and Z1, a 75 volt zener diode connected in parallel to the output of the bridge rectifier, form a voltage clamping network which clamps bell-tapping signals to 75 volts, a level [compatable] *compatible* with normal ringing signals. This network does not affect normal ringing signals, which are assumed not to have significant amounts of energy at potentials in excess of 75 volts. The oscillators require an operating threshold voltage of about 17 volts, before turning on, therefore, the values of C2, a 15 uf capacitor, and R5, a 4.7K resistor but which may have a value from 0 to 10K, are chosen such that C2 will not charge to a voltage level sufficient to turn on the oscillators with bell-tapping signals present on the telephone voltage supply lines. This method works because bell-tapping signals have a relatively short time duration compared to ringing signals. This circuitry does not inhibit the oscillators when normal ringing voltage is applied. The value of R6, a 15K discharge resistor for C2, is chosen to discharge C2, is chosen to discharge C2 fast enough between bell-tapping voltage pulses so that a sequence of pulses will not build a net charge on C2 of sufficient magnitude to turn on the oscillators. R6 may have a value of from 4.7 to 22K. Again, this circuity does not inhibit oscillator action for normal ringing voltage, because R6 does not discharge C2 fast enough to prevent normal ringing voltage from charging C2 to the operating threshold voltage of the oscillators.

Element Q1, connected in series between the bridge rectifier 1C2 and R5, is a 2N2222 NPN transistor [with] *connected such that* its base emitter junction *will be* [reversed] *reverse* biased. This acts as a zener diode which does not conduct current until a voltage level of approximately 6 V is present at the output of the bridge rectifier. This makes the circuit function like an open circuit to normal talk signal voltages which are typically less than 3 volts. This provision prevents the circuit from loading down the telephone line by drawing current during such time that conversations are taking place.

The 15 uf capacitor C2 at 35 to 50 V, in addition to its bell-tapping suppression function, also serves as a filter capacitor to the power supply input of the oscillator and other circuitry in the FBA-405-478 I.C.

Components R3, a 220K resistor, C3, a 0.001 uf Mylar capacitor, and the appropriate section of the FBA-405-478 I.C., form the driving oscillator circuit. This oscillator warbles between two frequencies with its base frequency being controlled by the timing network R3 and C3.

Components R2, a 1.5 M resistor, C1, a 0.047 uf Mylar capacitor and the appropriate section of the FBA-405-478 I.C., form the warbling oscillator circuit which controls the warbling rate of the driving oscillator. The warbling rate is controlled by the timing network R2 and C1.

Element R4 [and] *a* 2.2K resistor, limits current spikes of the piezoelectric element, to prevent power supply perturbations.

During such time that normal operating is applied, the enabling part of the circuit operates in the following manner. The voltage is applied and current is limited through R1 and then is recitified by 1C2. The rectified voltage begins to charge C2 through R5 and when the voltage level on C2 reaches the operating threshold voltage for the oscillators, the oscillators are activated and a square wave signal is applied to the piezoelectric element XI. Simultaneously, R6 is electronically switched out of the circuit by 1C1 thus preventing it from discharging any current from C2. This allows maximum power available to be applied to the piezoelectric element driver during operation.

During such time that bell-tapping signals are applied, the disabling part ofthe circuit operates in the following manner. The voltage is again applied and current limited through R1, and then rectified by 1C2. The signal is then clamped at the output of 1C2 to 75 volts by Z1 and then charges C2 through R5 as before. Since a bell-tapping voltage pulse is typically of a short time duration, C2 does not charge to the operating threshold and, therefore, the oscillators are not activated and no voltage is applied to the piezoelectric element.

After the bell-tapping pulse subsides, the charge that is left on C2 is discharged through R6, so that when a series of bell-tapping pulses are applied, the net charge on C2 will be [sufficient] *insufficient* to activate the oscillators.

During such time that talk signals are present on the telephone voltage supply line, the talk signal is rectified through [1C1] *1C2* but is then blocked by the zener action of Q1. This allows the device to exhibit a high impedance to talk signals.

This circuit has the property of withstanding voltage transients in the order of 2500 volts. Protective elements in this circuit include R1, 1C2, Z1, Q1, and R5 as well as in the chip 1C1 itself. Element R1 is limiting impedance and the function of 1C2 was described above. The element Z1 is a clamping component and has the effect of limiting the input voltages to no more than about 75 volts in the positive direction. The dropping device Q1 is used to obtain a disconnect effect and R5 is a second limiting resistor which serves to further increase the impedance that protects the inputs. Thus, the circuit is well protected from transients.

Signalling voltage pulses from the telephone line usually range from 80 to 110 volts. The noise voltage pulses resulting from normal use of the telephone instrument usually run from 45 to 250 volts. With the circuit of FIG. 5, practically all noise pulses will be suppressed. Therefore, these pulses will be prevented from operating the oscillator circuit to develop spurious sound by the disabling means for the oscillator circuit. Voltages through the leads are received and full wave bridge rectification thereof is effected and only voltages in the selected range of proper signalling voltages are applied to the oscillator circuit by the disabling circuit. The oscillator frequency can be controlled independently of the disabling circuit so that changing one parameter will not affect the other. The square waves produced by the oscillator circuit have a higher harmonic content with a louder sound output. The circuit disclosed includes a separate square wave oscillator driving stage connected to a downstream buffering and driving stage and only the buffering stage applies power to the piezoelectric crystal.

The telephone signalling device of this invention, with the mechanical elements and circuit elements described in the assembly shown and described, is much smaller, lighter, simpler and more efficient than the electromechanical bell which it is designed to replace. The small size and low weight not only facilitate replacement of present telephone bells but will enable the design of new styles of telephone instruments which are of smaller compact form and more streamlined. For example, [the size of] the device described [and] with the stated elements assembled as indicated, occupied a mere [B] 1.39 cubic inches of volume. This [is versus] *may be compared with* the approximately 15.5 cubic inches of volume occupied by the conventional bell ringer incorporated in the common type of desk phone.

It has been found, in actual use, that the device of this invention has an increased penetrating, insistent but not unpleasant two-frequency warble tonal quality. It can be adjusted by the mechanical volume control or dampener through a continuously-variable range to very low sound levels which permits a much quieter signal for office use or other similar desirably unobtrusive applications.

The standard electromechanical ringer is mechanically resonant, that is selective, to certain frequencies of ringer signals. These frequencies are several and lie in a band of 16 Hz. to 66 Hz. Originally this provision was to allow selective ringing on party lines. As party lines are now on the wane, this consideration is diminishing in importance. Most areas have available private line service, but many of the old, odd frequency ringers are still in use because it is economical to retain the equipment and because [hundred] *hundreds* of thousands of telephones with odd frequency ringers were installed in the field. To avoid changing the ringer supplies and connections, when individual telephones are repaired or installed on an odd frequency line, an appropriately resonant ringer must be used. This tends to make the inventory and replacement of ringers complex in some areas of the country. The device of this invention, on the other hand, is non-frequency selective and responds only to the presence of proper signalling voltage on the line. This means that it will operate with any private line connection, regardless of ringer frequency. This is sure to be desirable in the context of the preceding situation.

As indicated previously, others have developed or attempted to develop electronic ringer substitutes. The resulting hardware has had limited application on office phones and PBX systems. Low volume outputs, lack of volume control, unpleasant tunes, size, reliability and noise pulse suppression were all limiting factors. The very simple but effective noise pulse suppression incorporated in this device is very desirable. Others have gone to considerable lengths to effect this capability and the design has suffered economically and technically as [compare] *compared* to the system disclosed herein.

Some of the other ringers in use appear to be well designed electronically but feature loud speakers or standard telephone (audio) receivers as the sound transducer. The piezoelectric unit provided by this invention offers advantages in sound output and efficiency over both, and a reliability advantage over the loud [apeaker] *speaker* in addition. The sealed waterproofed circuit is also an important advantage over the other ringers. Also, the transient, that is lightening, protection capability is an integral feature of the device of this invention.

The advantages of the bridge rectifier incorporated in the circuit of this invention may be summarized as follows:

(1) Bridge rectifier improves efficiency by a factor of two.

(2) Warbling oscillator is louder, sounds more pleasant and eliminates the need for a tuning step in production.

(3) Bell tapping performance is further improved while maintaining or improving a desired low turn-on voltage.

(4) The linear bipolar transistor integrated circuit is much more rugged than its Complementary Metal Oxide Semi Conductor predecessor. It will be easier to protect and reliable in service.

Thus, it will be apparent that the electronic audio device or unit of this invention has many advantageous characteristics which make it very desirable to substitute it for the usual electromechanical ringer of a telephone, either as a replacement for that ringer in existing telephone instruments or as a part of the original manufactured instrument.

Having thus described this invention what is claimed is:

1. A signalling device for telephones or the like comprising a housing, a printed circuit board mounted within the housing and carrying solid state circuit components in a circuit, a piezoelectric actuated flexible diaphragm also mounted within the housing in spaced relationship to said circuit board, said flexible diaphragm carrying a piezoelectric element connected in the circuit, said circuit including:

a set of leads adapted to be connected to the telephone voltage supply line for receiving signalling voltage therefrom;

a square wave oscillator audio-signalling circuit connected to said leads and including a square wave driving network with oscillator frequency controlling components connected to a buffer driving network including said piezoelectric element;

a rectifying and voltage-limiting network connected between the leads and the oscillator circuit for receiving, rectifying and limiting the voltage supplied by the telephone voltage supply line to a selected range and applying the resulting output voltage to the oscillator circuit, said rectifying and voltage limiting network including a full wave bridge rectifier which effects full wave rectification of the incoming signal voltage allowing both halves to provide voltage to the oscillator circuit, a voltage dropping element connected with the bridge rectifier to serve as a current limiting element to protect the rectifier, and a voltage clamping element connected to the output of the rectifier and cooperating with said voltage dropping element for suppressing the application of voltages other than proper signalling voltages to the oscillator circuit; and a disabling network connected between the leads and the oscillator circuit for disabling the oscillator circuit except when proper signalling voltage is supplied through said leads so as to prevent undesired audio outputs in the telephone to which it is applied when voltages other than proper signalling voltages are present on the telephone voltage supply line, said disabling network including signal-attenuating components for preventing application of voltages to the oscillator circuit unless they are in the selected range of proper signalling voltages.

2. A signalling device according to claim 1 in which the voltage dropping element comprises a current limiting resistor connected in series with the input of the bridge rectifier and the voltage clamping element comprises a zener diode, connected in parallel to the output of the bridge rectifier.

3. A signalling device according to claim 1 in which a disconnect zener diode is connected in series with the output of the bridge rectifier.

4. A signalling device according to claim 3 in which the signal attenuating components of the disabling network comprise a resistor connected in series with the disconnect zener to the power supply of the oscillator circuit and a capacitor connected from the power supply of the oscillator circuit to ground, and a resistor connected from ground through the oscillator power supply circuit to said capacitor and resistor.

5. A signalling device according to claim 1 in which the oscillator circuit comprises three linear bipolar transistor integrated circuit stages, a resistor connected in parallel with the first stage and in series with a capacitor which is connected to ground, a resistor connected in parallel with the second stage and in series with a capacitor which is connected to ground and a resistor connected in series between the third stage and the piezoelectric element.

6. A signalling device according to claim 5 in which the housing is tubular and has one end as an open outlet end;

said printed circuit board being on a first disc spaced axially within the open end;

said flexible diaphragm being a second disc mounted within the housing axially outwardly of the first disc to provide a space therebetween and carrying the piezoelectric element in the form of a crystal bonded to the diaphragm, the diaphragm being supported by the housing at its edge, said element being connected in circuit with the components on said board.

7. A signalling device according to claim 6 including:

a rigid baffle disc supported within the housing axially outwardly of the second disc and arranged to permit sound waves hitting the baffle disc to be deflected around its edge toward the outlet end of the housing thereby producinga folded horn [acoustical] *acoustical* loading characteristic.

8. A signalling device according to [claims 6 or] *claim* 7 including:

an adjustable mechanical volume control carried by the tubular housing adjacent its outlet end and spaced outwardly of said rigid baffle disc and consisting of:

relatively rotatable discs in superimposed relationship which have cooperating openings adapted to provide sound wave passages when in communication and movable relatively to vary the size of or close said passages.

9. A signalling device for telephones or the like comprising a housing, a printed circuit board mounted within the housing and carrying solid state circuit components in a circuit, a piezoelectric actuated flexible diaphragm also mounted within the housing in spaced relationship to said circuit board, said flexible diaphragm carrying a piezoelectric element connected in the circuit, said circuit including:

a set of leads adapted to be connected to the telephone voltage supply line for receiving signalling voltage therefrom;

an oscillator audio-signalling circuit connected to said leads and including said piezoelectric element;

a rectifying and voltage-limiting network connected between the leads and the oscillator circuit for receiving, rectifying and limiting the voltage supplied by the telephone voltage supply line to a selected range and applying the resulting output voltage to the oscillator circuit, said rectifying and voltage limiting network including a full wave bridge rectifier which effects full wave rectification of the incoming signal voltage allowing both halves to provide voltage to the oscillator circuit, a voltage dropping element connected with the bridge rectifier to serve as a current limiting element to protect the rectifier, and a voltage clamping element connected to the output of the rectifier and cooperating with said voltage dropping element for suppressing the application of voltages other than proper signalling voltages to the oscillator circuit; and a disabling network connected between the leads and the oscillator circuit for disabling the oscillator circuit except when proper signalling voltage is supplied through said leads so as to prevent undesired audio outputs in the telephone to which it is applied when voltages other than proper signalling voltages are present on the telephone voltage supply line, said disabling network including signal-attenuating components for preventing application of voltages to the oscillator circuit unless they are in the selected range of proper signalling voltages.

*10. A signalling device for telephones or the like comprising:*

*a set of leads adapted to be connected to a telephone line for receiving signalling voltage therefrom;*

*a square wave oscillator audio-signalling circuit connected to said leads and including a square wave driving network with oscillator frequency controlling components connected to a buffer driving network including a driven audio signal device;*

*a rectifying and voltage-limiting network connected between said leads and said oscillator circuit for receiving, rectifying and limiting the voltage supplied by the telephone line to a selected range and applying the resulting output voltage to the oscillator circuit, said rectifying and voltage limiting network including a full wave bridge rectifier which effects full wave rectification of the incoming signal voltage, a voltage dropping element connected with the bridge rectifier to serve as a current limiting element to protect the rectifier, a voltage clamping element connected to the output of the rectifier and cooperating with said voltage dropping element for suppressing the application of voltages other than said proper signalling voltages to the oscillator circuit; and a disabling network con-*

*nected between said leads and the oscillator circuit for disabling the oscillator circuit except when proper signalling voltage is supplied through said leads so as to prevent undesired audio outputs in the telephone to which it is applied when voltages other than proper signalling voltages are present at said leads, said disabling network including signal-attenuating components for preventing application of voltages to the oscillator circuit unless they are in the selected range of proper signalling voltages.*

*11. A signalling device according to claim 10 in which the voltage dropping element comprises a current limiting resistor connected in series with the input of the bridge rectifier and said voltage clamping element comprises a zenner diode, connected in parallel to the output of the bridge rectifier.*

*12. A signalling device according to claim 10 in which a disconnect diode exhibiting a zener diode characteristic is connected in series with the output of the bridge rectifier.*

*13. A signalling device for telephones comprising:*

*lead means connectible to receive telephonic signals including ring and audio signals;*

*rectifier means having an input coupled with said lead means for rectifying said telephonic signals and providing a corresponding d.c. signal at an output thereof;*

*solid state blocking means exhibiting a zener diode characteristic coupled with said output of said rectifier means, said characteristic being selected to effect blockage of conduction of all said d.c. signals having a voltage level corresponding with said audio signals and conducting said d.c. signals above said level at an output thereof;*

*circuit means including oscillator means and switching means coupled with said blocking means output and responsive to an operating threshold voltage of predetermined level for activation to provide an oscillatory output;*

*driven audio signal device means responsive to said oscillatory output for deriving an audio output;*

*R-C network means coupled intermediate said blocking means and said circuit means, including resistor means and capacitor means having respective resistance and capacitance values selected for deriving said predetermined threshold level to activate said circuit means only in the presence of a said d.c. signal of duration corresponding with that of a said ring signal; and*

*discharge resistor means normally electrically connected with said capacitor means for effecting the discharge thereof and disconnected therefrom by said switching means when said oscillator means responds to said predetermined threshold level.*

*14. The signalling device of claim 13 including voltage clamping means coupled with said rectifier means output for suppressing spurious signals other than said ring signals.*

*15. The signalling device of claim 14 in which said solid-state blocking means is the base-emitter junction of an NPN transistor having an open collector.*

*16. The signalling device of claim 13 including current limiting impedance means coupled with said rectifier means input for substantially absorbing the energy of high voltage spurious signals.*

*17. The signalling device of claim 13 including:*

*voltage clamping means coupled with said rectifier means output for suppressing spurious signals other than said ring and audio signals; and*

*current limiting impedance means coupled with said rectifier means input for substantially absorbing the energy of high voltage spurious signals.*

*18. The signalling device of claim 17 in which said solid-state blocking means is the base-emitter junction of an NPN transistor having an open collector.*

*19. The signalling device of claim 18 in which said rectifier means is a full wave rectifier.*

*20. The signalling device of claim 13 in which said solid state blocking means is the base-emitter junction of an NPN transistor having an open collector.*

*21. The signalling device of claim 13 in which said rectifier means is a full wave rectifier.*

* * * * *